(12) United States Patent  
Lopatinsky et al.

(10) Patent No.: US 7,623,013 B2
(45) Date of Patent: Nov. 24, 2009

(54) ELECTROMAGNETIC MOVING SYSTEM

(75) Inventors: Edward Lopatinsky, San Diego, CA (US); Lev Fedoseyev, El Cajon, CA (US); Daniel Schaefer, Kanarravile, UT (US)

(73) Assignee: Industrial Design Laboratories, Inc, San Diego, CA (US)

( * ) Notice: Subject to any disclaimer, the term of this patent is extended or adjusted under 35 U.S.C. 154(b) by 450 days.

(21) Appl. No.: 11/728,989

(22) Filed: Mar. 28, 2007

(65) Prior Publication Data

US 2008/0238218 A1 Oct. 2, 2008

(51) Int. Cl.
*H01F 5/00* (2006.01)
*H02K 41/00* (2006.01)

(52) U.S. Cl. ............... 335/299; 310/12; 310/156.32; 310/156.37; 310/DIG. 6; 361/695

(58) Field of Classification Search ........... 335/299; 310/12, 63, 156.32–156.37, 179, 184, DIG. 6; 104/281, 286; 361/695–697; 336/200, 232
See application file for complete search history.

(56) References Cited

U.S. PATENT DOCUMENTS

| | | | |
|---|---|---|---|
| 3,729,866 A | 5/1973 | Faller et al. | |
| 4,217,727 A | 8/1980 | Fetty et al. | |
| 4,340,833 A * | 7/1982 | Sudo et al. | 310/268 |
| 4,459,438 A | 7/1984 | Kaiser | |
| 4,570,092 A | 2/1986 | Ishimoto | |
| 4,645,961 A * | 2/1987 | Malsky | 310/156.07 |
| 4,804,574 A * | 2/1989 | Osawa et al. | 428/209 |
| 4,861,306 A | 8/1989 | Bolli et al. | |
| 4,993,985 A | 2/1991 | Bass et al. | |
| 5,334,899 A * | 8/1994 | Skybyk | 310/268 |
| 5,510,663 A | 4/1996 | Loenen | |
| 5,646,464 A * | 7/1997 | Sickafus | 310/40 MM |
| 5,874,881 A | 2/1999 | Steinbusch | |
| 6,648,724 B1 | 11/2003 | Tammera | |
| 6,664,673 B2 | 12/2003 | Lopatinsky et al. | |
| 6,700,781 B2 | 3/2004 | Chia-Kuan et al. | |
| 6,883,758 B2 | 4/2005 | Ruocchio | |
| 6,998,751 B2 * | 2/2006 | Lopatinsky et al. | 310/208 |
| 7,071,805 B2 * | 7/2006 | Hasegawa et al. | 336/200 |
| 7,345,398 B2 * | 3/2008 | Purvines et al. | 310/216.137 |
| 2003/0020353 A1 * | 1/2003 | Lopatinsky et al. | 310/208 |

(Continued)

FOREIGN PATENT DOCUMENTS

GB 979985 1/1965

(Continued)

*Primary Examiner*—Ramon M Barrera (57) ABSTRACT

An electromagnetic moving system comprises a stator, a moving body and a controller. The stator comprises a circuit board with two layers of electrically connected coil windings spaced apart in a series way and made as spirals with center and peripheral points. The spirals of one layer are shifted in respect to the spirals of the adjacent layer along the line connecting the center points thus the center points of the spirals of one layer in transparent view are located between two nearest spirals of the adjacent layer. Each of the spirals of one layer in transparent view at least partially overlaps two nearest spirals of the adjacent layer. The moving body is comprised of one permanent magnet such as to cause interaction with the stator when it is powered, thus creating a force tending to propel the moving body along the line connecting said center points.

11 Claims, 11 Drawing Sheets

U.S. PATENT DOCUMENTS

| | | | |
|---|---|---|---|
| 2003/0048013 A1* | 3/2003 | Lopatinsky et al. | 310/52 |
| 2004/0245866 A1* | 12/2004 | Lopatinsky et al. | 310/64 |
| 2005/0285470 A1* | 12/2005 | Itoh et al. | 310/208 |
| 2006/0005735 A1 | 1/2006 | Lopatinsky et al. | |
| 2007/0283841 A1 | 12/2007 | Lopatinsky et al. | |

FOREIGN PATENT DOCUMENTS

| | | |
|---|---|---|
| JP | 2000228858 | 8/2000 |
| WO | WO 2007/097899 A2 | 8/2007 |

* cited by examiner

ELECTROMAGNETIC MOVING SYSTEM

FIELD OF THE INVENTION

The present invention relates generally to electromagnetic systems for moving mechanical bodies along predefined linear and/or curved ways. More particularly, the present invention relates to toy and/or entertainment systems, and all subsystems in which are useful to controllably move an object upon a surface. The present invention is particularly, but not exclusively, useful for systems that relates to toy motion devices like trains and railway vehicles.

At the same time the present invention may be relate to some types of blowers for cooling of electronic devices and be useful for cooling systems for regulating the temperature of electronic components of blade servers.

BACKGROUND OF THE INVENTION

There are known electromagnetic moving systems that include a stator made as one layer circuit board, and at least one body moving along the way defined by the stator configuration. For example, the GB Patent No 979985 "Improvements in or relating to Electrically Propelled Toys" discloses the one layer linear stator design. And there is the U.S. Pat. No. 6,700,781 "Heat-Dissipating Module for Removing Heat Generated from Heat-Generating Device" that discloses the one layer circular (radial) stator design for radial type blower.

There are numerous designs of electromagnetic moving systems that include an enhanced stator made as at least two layers circuit board, and at least one body moving along the way defined by the stator configuration, linear or circular ones. For illustration, see U.S. Pat. No. 5,510,663 "Electrodynamic device", U.S. Pat. No. 5,874,881 "Electromechanical device", U.S. Pat. No. 6,664,673 "Cooler for electronic devices" and Japanese Patent Application No JP2000228858 "Coil structure of linear motor". These designs relate to both linear and circular electric drives. In the latter case a moving body is made as a magnetized impeller with blades serves as a rotor.

The stator of such known devices comprises of a circuit board with at least two layers of electrically connected coil windings made as spirals with a center and a peripheral points. In transparent view the center points of coil windings of adjacent layers are coincided and electrically connected by via's. Such stator design restricts the minimum distance between coil windings magnetic poles by at least width of the coil winding.

The main problem with all such known devices is that it is difficult to provide reliable smooth speedy motion to such moving bodies because of the relative large distance between the magnetic poles. Such magnetic poles configuration requires increasing alternative forces to achieve enough attraction and tending to propel the moving body and needs much more power.

Therefore, it would be generally desirable to provide an electromagnetic moving system that overcomes such problem and provides less power to achieve smooth motion at enough attraction namely.

SUMMARY OF THE INVENTION

According to the present invention an electromagnetic moving system comprised of a stator, at least one moving body and a controller. The stator comprised of a circuit board with at least two layers of electrically connected coil windings spaced apart in a series way and made as spirals with a center and a peripheral points. Each of the spirals has a magnetic axis substantially perpendicular to the plane of the corresponding coil winding.

The general idea of the claimed invention is that the spirals of one layer are shifted in respect to the spirals of the adjacent layer along the line connecting the center points in such a way thus the center points of the spirals of one layer in transparent view are located between two nearest spirals of the adjacent layer. This specific feature in the stator design provides less distance between the coil windings magnetic poles thus require less power to achieve smooth motion with minimal attraction. According to this the claimed invention is characterized by being more efficient in comparison with known designs, operating under equal conditions.

In order to achieve these objectives, according to the first embodiment of the present invention, each of the spirals of one layer in transparent view at least partially overlaps the two nearest spirals of the adjacent layer. Each of the magnetic axes of the coil windings of one layer has an opposite direction in respect to the magnetic axis direction of two nearest coil windings of the adjacent layer when powered. The moving body is comprised of at least one permanent magnet such as to cause interaction with the stator when it is powered, thus creating a force tending to propel the moving body along the line connecting the center points.

The spirals are identical and the center point of each of the spirals of one layer is electrically connected through the circuit board by internal via's, which is a copper plated hole, with the peripheral point of the nearest spiral of the adjacent layer, while the peripheral point of each of the spirals of one layer is electrically connected by the via's with the central point of the other nearest spiral of the adjacent layer thus the stator serves as a single phase stator.

The stator is incorporated with a track having a contact surface, and a moving body located on the contact surface, and the line connecting the center points of the spirals is an assembly of straight and curved lines connected in a series way, thus the system serves as a linear electric drive. The line connecting the center points of the spirals may form a close loop.

According to the second embodiment of the present invention, the spirals are identical and the center point of each of the spirals of one layer is electrically connected through the circuit board by internal via's, which is a copper plated hole, with the peripheral point of the spiral following next of the nearest spiral of the adjacent layer, while the peripheral point of each of the spirals of one layer is electrically connected by the via's with the central point of the spiral following next of the another nearest spiral of the adjacent layer thus the stator serves as a three-phase stator.

According to the third embodiment of the present invention, each two adjacent spirals of each layer are oriented opposite one to one and coupled in pair with the mutual peripheral points. Each of the center points of each of the pairs of each layer are electrically connected with the nearest center points of the adjacent pairs of the same layer by the jumpers, thus said stator servers as a two-phase stator.

There is the forth embodiment when the stator comprise six identical layers of electrically connected coil windings shifted in respect with each other and the center points of the first layer are electrically connected by the via's with the central points of the fourth layer, the center points of the second layer are electrically connected by the via's with the central points of the fifth layer and the center points of the third layer are electrically connected by the via's with the central points of the sixth layer correspondingly, thus the stator servers as a three-phase stator. The line connecting the center points of the spirals is a circle and the system further comprises a shaft placed at the center of the circle and connected with the moving body, thus the moving body serves as a rotor of a circular electric drive. There is a design option of the fourth embodiment when the moving body is made as a magnetized impeller with blades thus the system serves as an electric fan.

The foregoing and other objectives, features and advantages of the invention will be more readily understood upon consideration of the following detailed description of the invention, taken in conjunction with the accompanying drawings.

DETAILED DESCRIPTION OF THE INVENTION

The present invention will be described in detail below with reference to the accompanying drawings.

FIGS. 1-8A show embodiments of the present invention.

Figure 1:
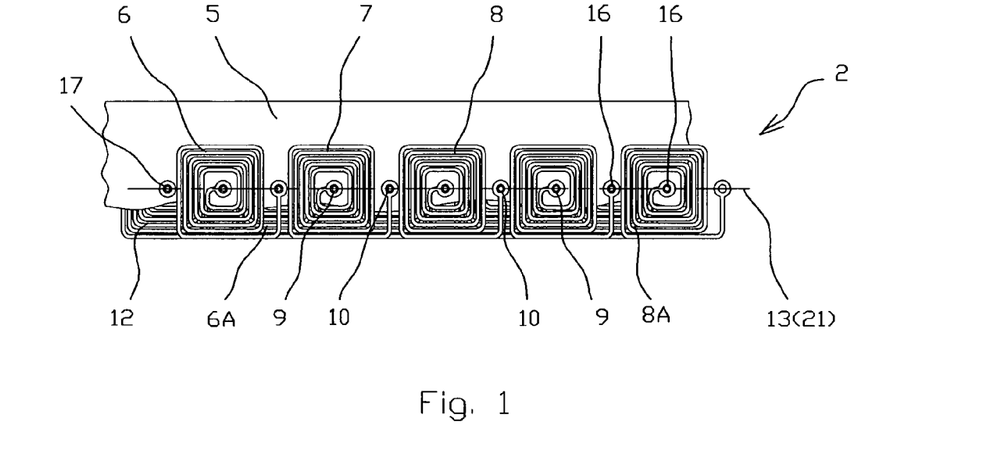
FIG. 1 is a top view of the single phase linear stator according to the first embodiment of the present invention.
Figure 1A:
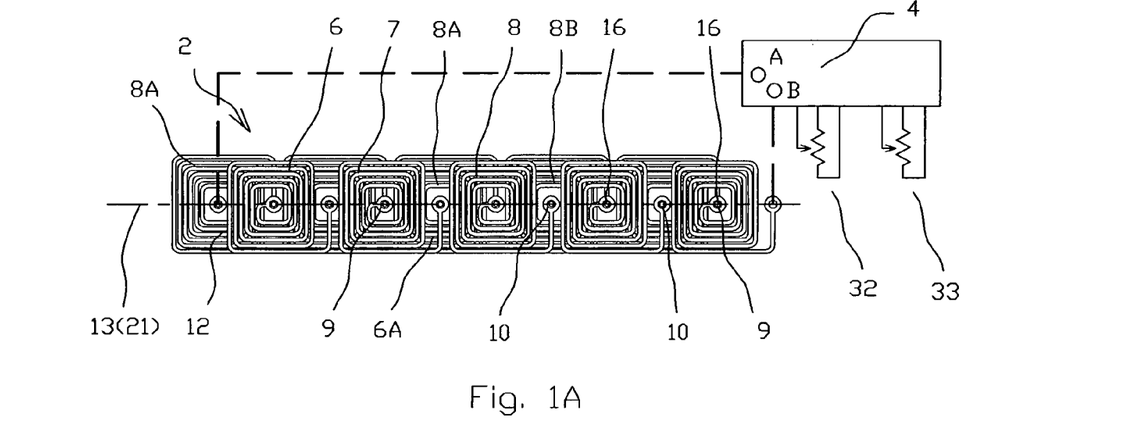
FIG. 1A is a partial top view showing the single phase stator according to the first embodiment of the present invention when circuit board is not shown.
Figure 1B:
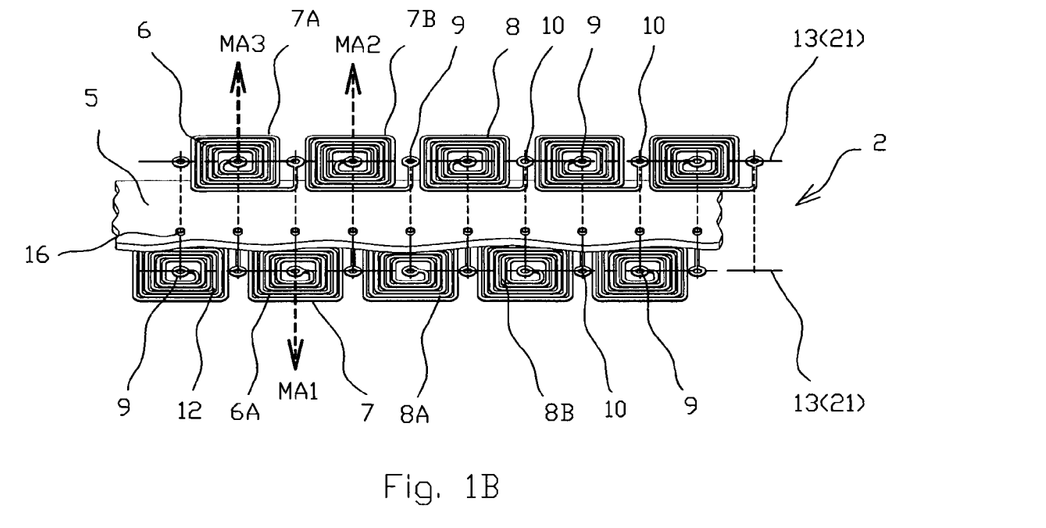
FIG. 1B is a perspective view showing the single phase stator according to the first embodiments of the present invention.
Figure 2:
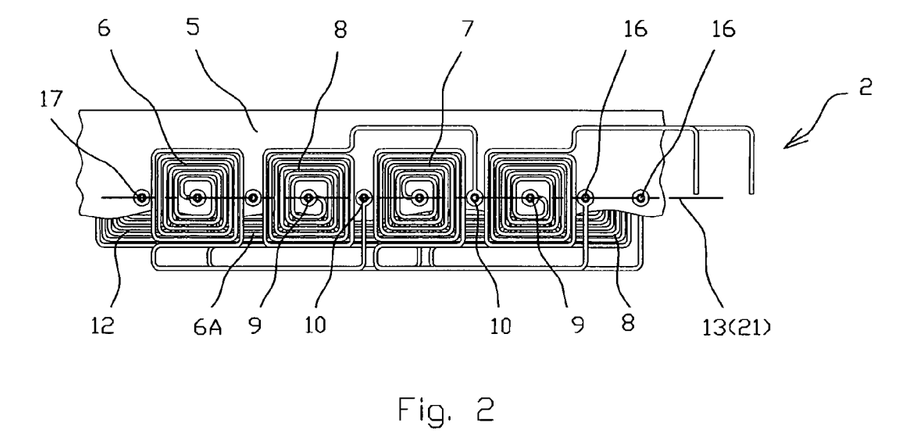
FIG. 2 is a top view of the three-phase stator according to the second embodiment of the present invention.
Figure 2A:
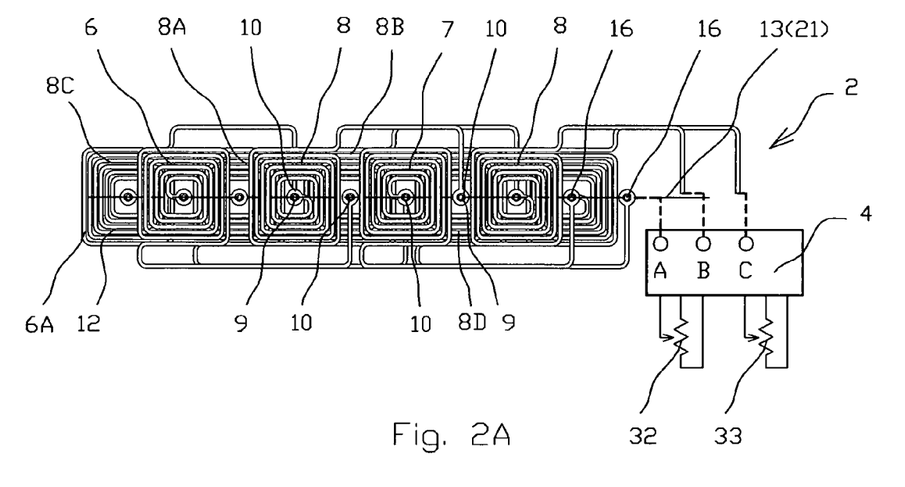
FIG. 2A is a partial top view showing the three-phase stator according to the second embodiment of the present invention when circuit board is not shown.
Figure 3:
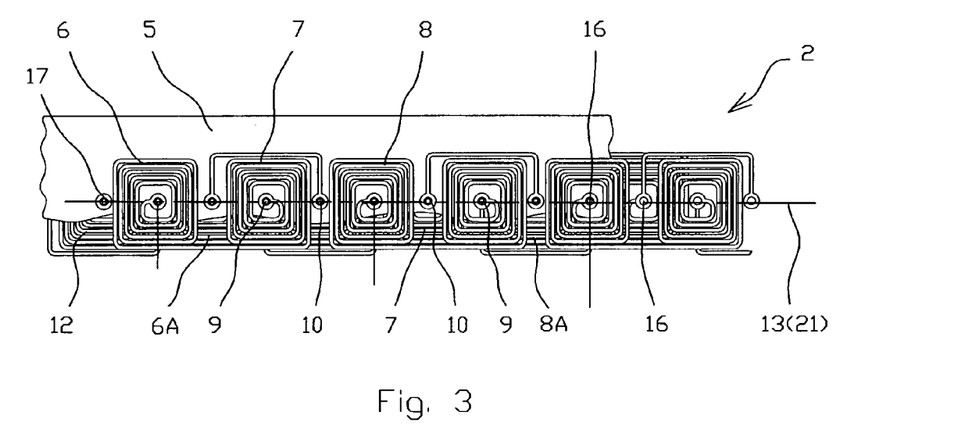
FIG. 3 is a top view of the two-phase stator according to the third embodiment of the present invention.
Figure 3A:
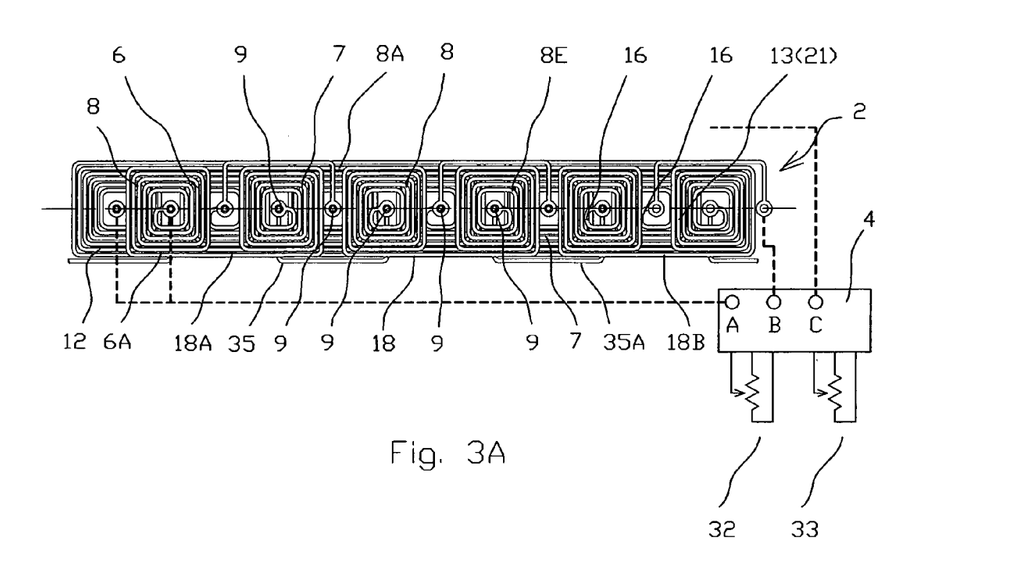
FIG. 3A is a partial top view showing the two-phase stator according to the third embodiment of the present invention when circuit board is not shown.
Figure 3B:
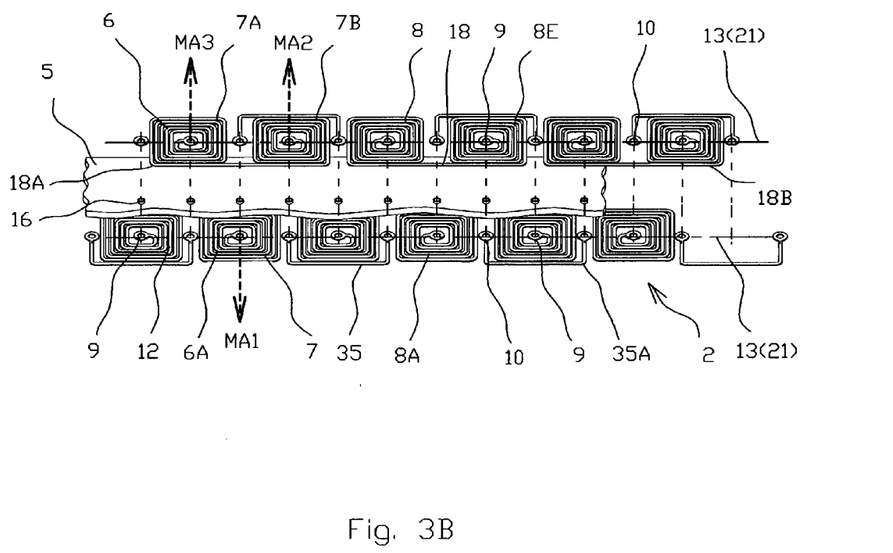
FIG. 3B is a perspective view showing the two-phase phase stator according to the third embodiments of the present invention.

The electromagnetic moving system (FIGS. 6-8) comprises a stator 2 (FIGS. 1-8A), at least one moving body 3 (FIGS. 6-8A) and a controller 4 (FIGS. 1A, 2A and 3A). The stator 2 comprises a circuit board 5 with at least two layers 6 of electrically connected coil windings 7 spaced apart in a series way and made as spirals 8 with a center 9 and a peripheral 10 points. Each of the spirals 8 has a magnetic axis substantially perpendicular to the plane of the corresponding coil winding 7.

The general idea of the claimed invention is that the spirals 8 of one layer 6 are shifted in respect to the spirals 8A of the adjacent layer 6A along the line connecting the center points 9 in such a way thus the center points 9 of the spirals 8 of one layer 6 in transparent view are located between two nearest spirals 8A and 8B of the adjacent layer 6A (FIGS. 1A, 1B, 2A, 2B, 3A, 3B and 5). This specific feature for stator 2 design provides less distance between the magnetic poles of the coil windings 7 thus require less power to achieve smooth motion minimal magnetic attraction. At the same time, such stator design provides enhanced magnetic forces because the left part of the spiral 8 of the layer 6 coincides by current direction with the right part of the spiral 8A of the layer 6A and the right part of the spiral 8 of the layer 6 coincides by current direction with the left part of the spiral 8B of the layer 6A. The main objective of the present invention makes it much better than all known technical solutions in this field for the following reasons: electromagnetic interaction between the coils windings 7 of the adjacent layers 6 provides smooth motion of the moving body 3 with minimal magnetic attraction and lower heat generation. Therefore, the electromagnetic moving system 1 requires less power. It makes the electromagnetic moving system 1 much more reliable and efficient.

Each of the spirals 8 of one layer 6 in transparent view at least partially overlaps two nearest spirals 8A and 8B of the adjacent layer 6A. Each of the magnetic axes of the coil windings 7 of one layer 6A has an opposite direction in respect to the magnetic axis direction of two nearest coil windings 7A and 7B of the adjacent layer 6 when powered. The moving body 3 comprises at least one permanent magnet 15 such as to cause interaction with the stator 2 when it is powered, thus creating a force tending to propel the moving body 3 along the line connecting the center points 9.

According to the first embodiment of the present invention (FIGS. 1-1B), the spirals 8 are identical and the center point 9 of each of the spirals 8 of one layer 6 is electrically connected through the circuit board 5 by internal via's 16, which is a copper plated hole 17, with the peripheral point 10 of the nearest spiral 8 of the adjacent layer 6A, while the peripheral point 10 of each of the spirals 8 of one layer 6 is electrically connected by the via's 16 with the central point 9 of the another nearest spiral 8 of the adjacent layer 6A thus the stator 2 serves as a single phase stator.

Figure 8:
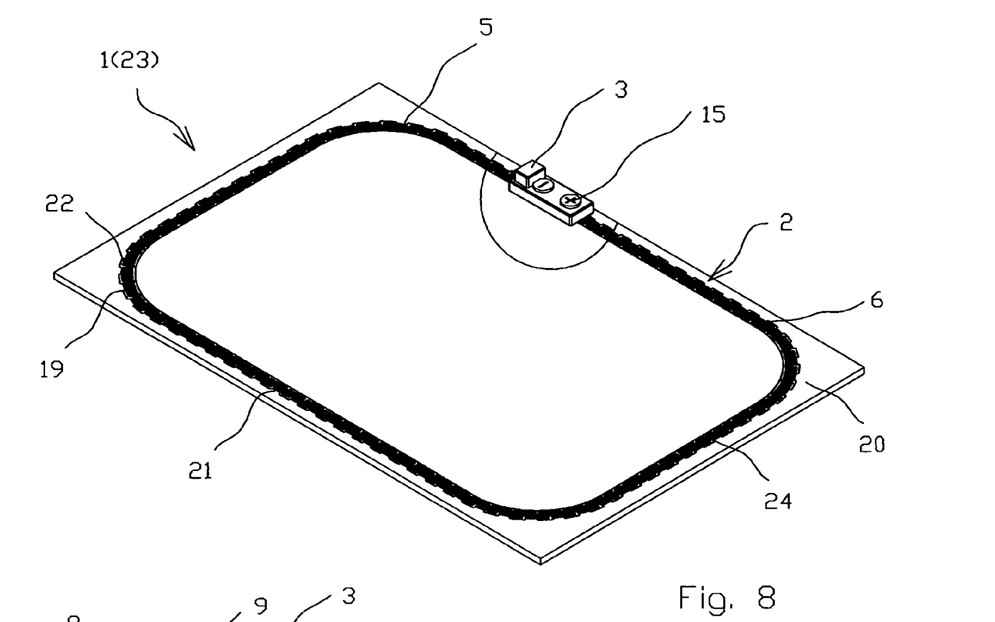
FIG. 8 is a perspective view showing the electromagnetic moving system according to the first embodiments of the present invention when the system serves as a linear electric drive.
Figure 8A:
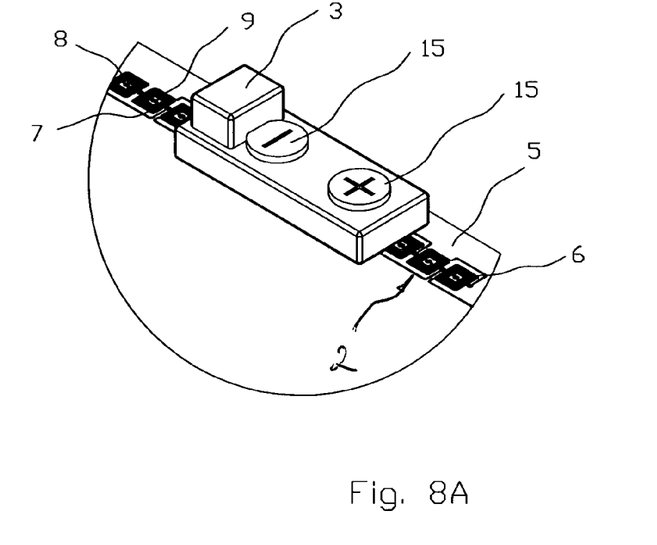
FIG. 8A is an enlarged partial perspective view of FIG. 8 showing the electromagnetic moving system according to the first embodiments of the present invention when the system serves as a linear electric drive.

The stator 2 is incorporated with a track 19 with a contact surface 20, and the moving body 3 located on the contact surface 20, and the line connected the center points 9 of the spirals 8 is an assembly of straight 21 and curved 22 lines connecting in a series way, thus the system 1 serves as a linear electric drive (FIGS. 8 and 8A). The line connecting the center points 9 of the spirals 8 may form a close loop 24.

The stator 2 of the electromagnetic moving system 1 according to the first embodiment operates in the following ways. When electrical power is supplied from the power source (not shown) through the connectors A and B of the controller 4 to the coils windings 7 of the layers 6 and 6A that operate together as the stator 2 (FIG. 1A), alternating electromagnetic fields are created and controlled by the speed 32 and voltage 33 regulators.

Figure 2B:
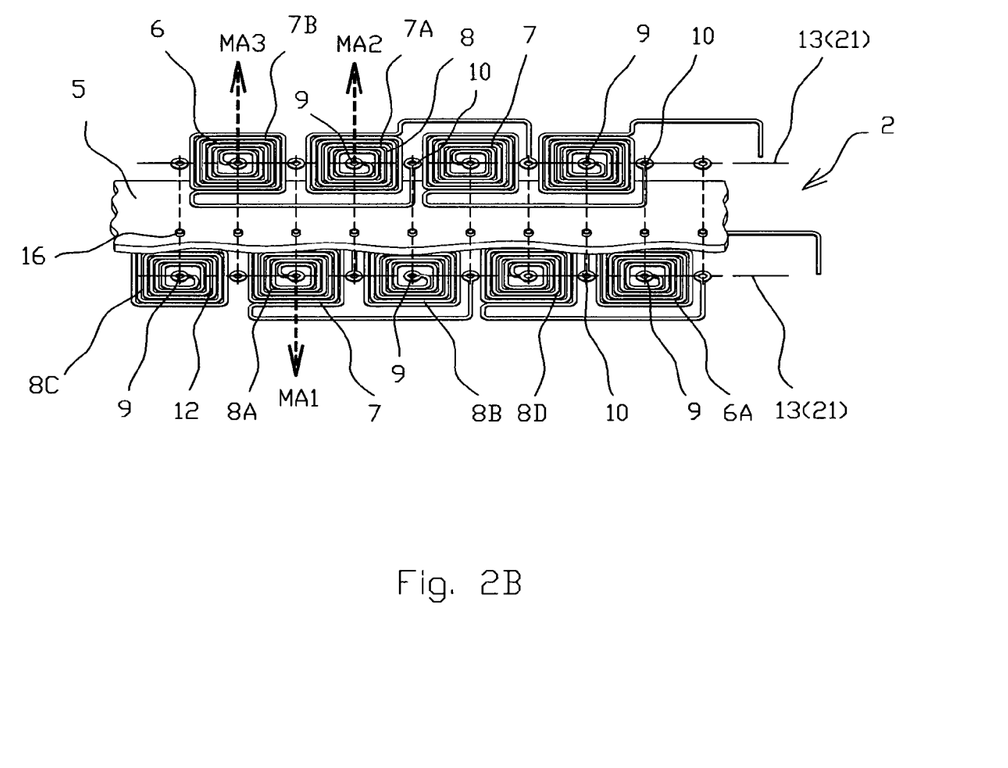
FIG. 2B is a perspective view showing the three-phase phase stator according to the second embodiments of the present invention.

There is the second embodiment of the present invention (FIGS. 2-2B). The spirals 8 are identical and the center point 9 of each of the spirals 8 of one layer 6 is electrically connected through the circuit board 5 by internal via's 16, which is a copper plated hole 17, with the peripheral point 10 of the spiral 8C following next of the nearest spiral 8A of the adjacent layer 6A, while the peripheral point 10 of each of the spirals 8 of one layer 6 is electrically connected by the via's 16 with the central point 9 of the spiral 8D following next of the another nearest spiral 8B of the adjacent layer 6A thus the stator 2 serves as a three-phase stator.

The stator 2 of the electromagnetic moving system 1 according to the second embodiment operates in the following ways. When electrical power is supplied from the power source (not shown) through the connectors A, B and C of the controller 4 to the coils windings 7 of the layers 6 and 6A that operate together as the stator 2 (FIG. 2A), alternating electromagnetic fields are created and controlled by the speed 32 and voltage 33 regulators.

According to the third embodiment of the present invention, each two adjacent spirals 8 and 8E of each layer 6 are oriented opposite one to one and coupled in pair 18 with the mutual peripheral points. Each of the center points 9 of each of the pairs 18 of each layer 6 are electrically connected with the nearest center points 9 of the adjacent pairs 18A and 18B of the same layer 6 by the jumpers 35 and 35A located at the adjacent layer 6A, thus said stator 2 servers as a two-phase stator.

The stator 2 of the electromagnetic moving system 1 according to the third embodiment operates in the following ways. When electrical power is supplied from the power source (not shown) through the connectors A, B and C of the controller 4 to the coils windings 7 of the layers 6 and 6A that operate together as the stator 2 (FIG. 3A), alternating electromagnetic fields are created and controlled by the speed 32 and voltage 33 regulators.

Figure 4:
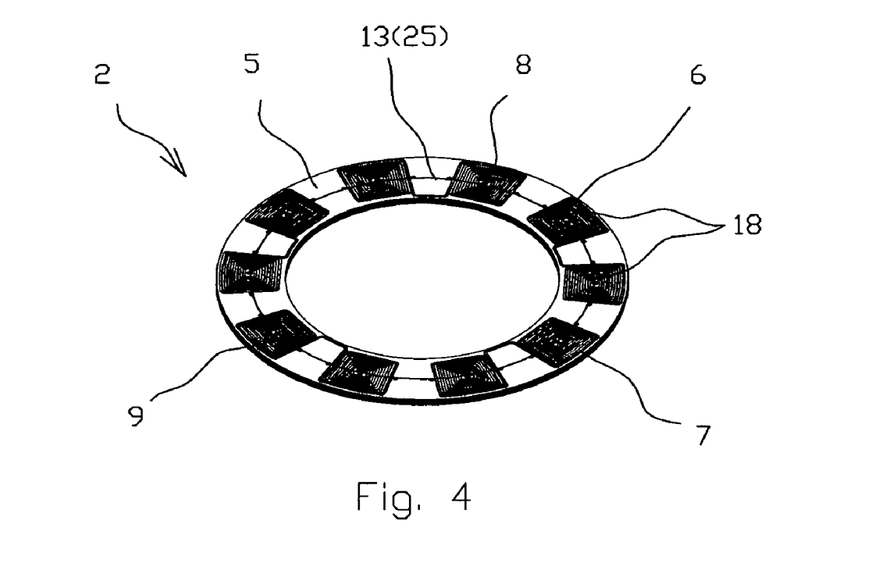
FIG. 4 is a perspective view showing the three-phase phase radial stator according to the fourth embodiments of the present invention.
Figure 4A:
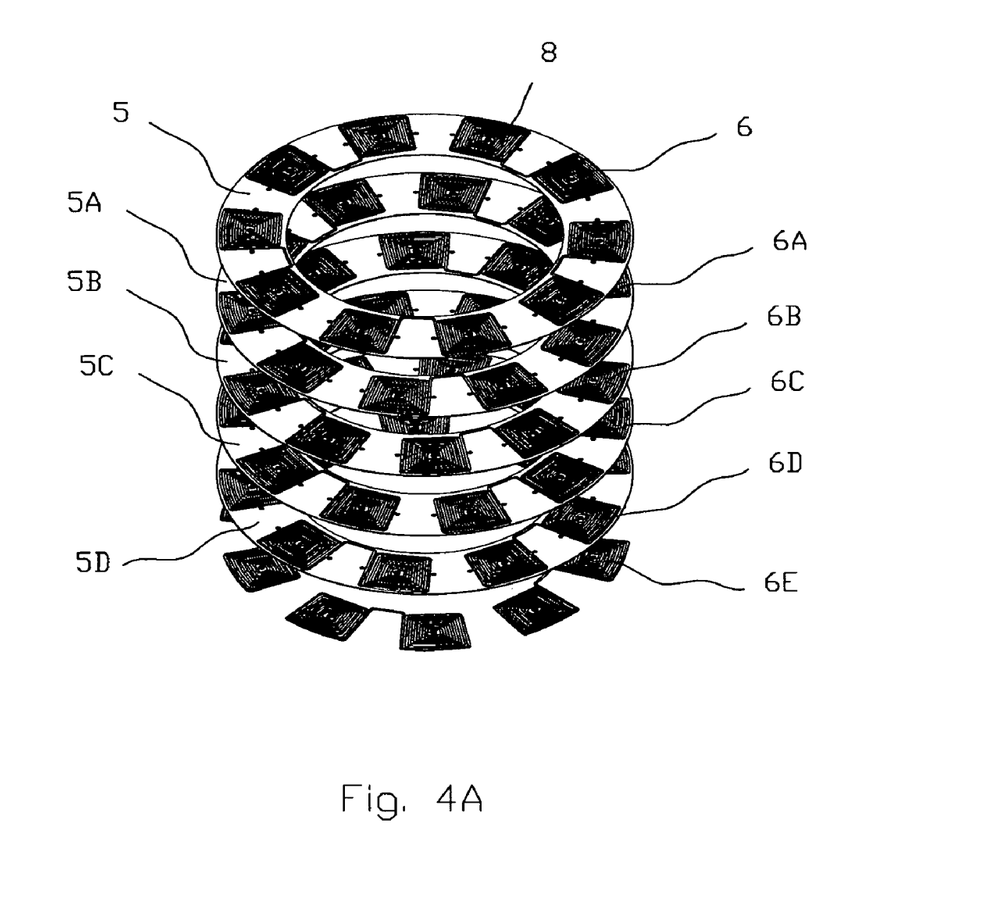
FIG. 4A is an exploded layer by layer perspective view showing the three-phase phase radial stator according to the fourth embodiments of the present invention.
Figure 5:
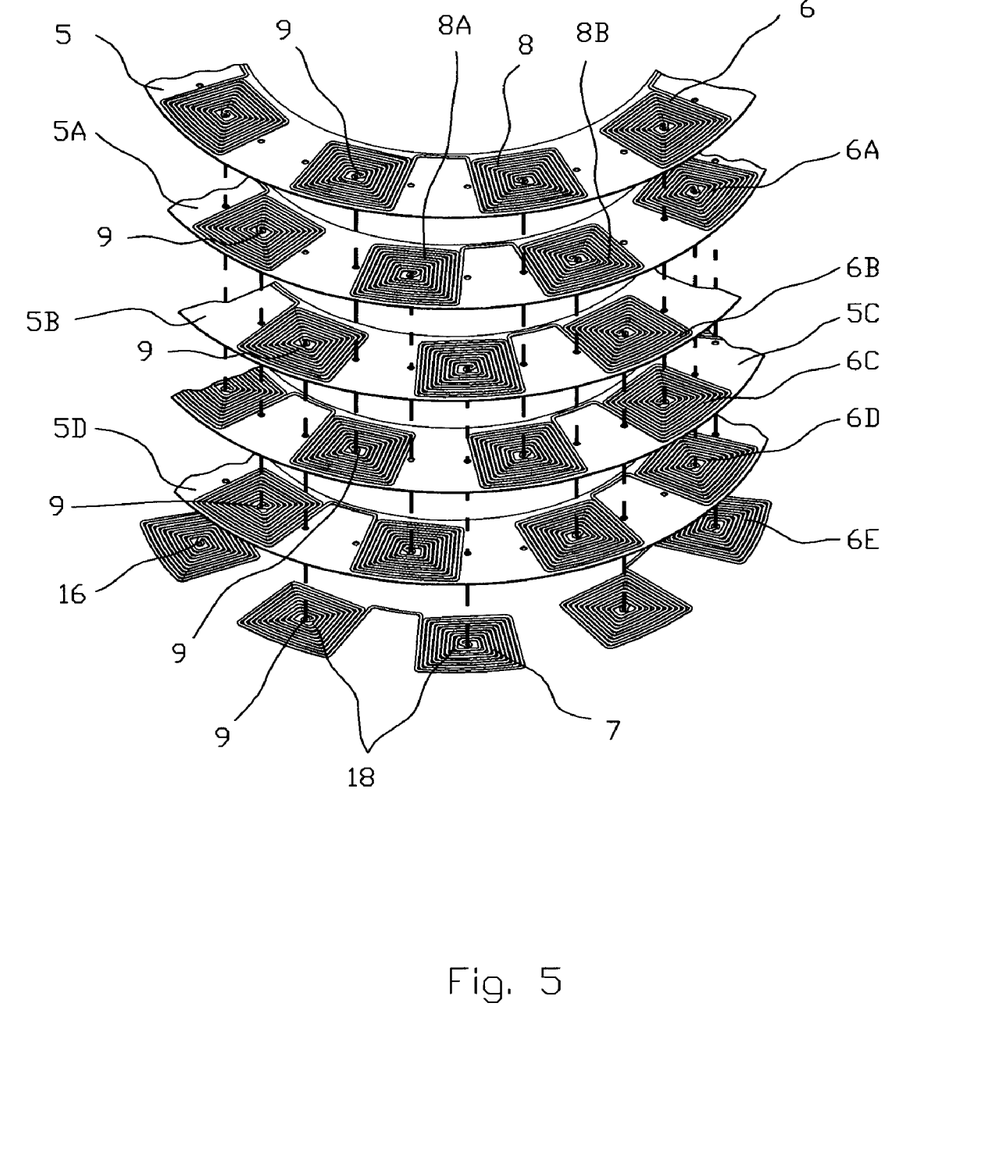
FIG. 5 is a partial enlarged view of FIG. 4A showing the disassembled three-phase phase radial stator according to the fourth embodiments of the present invention.
Figure 6:
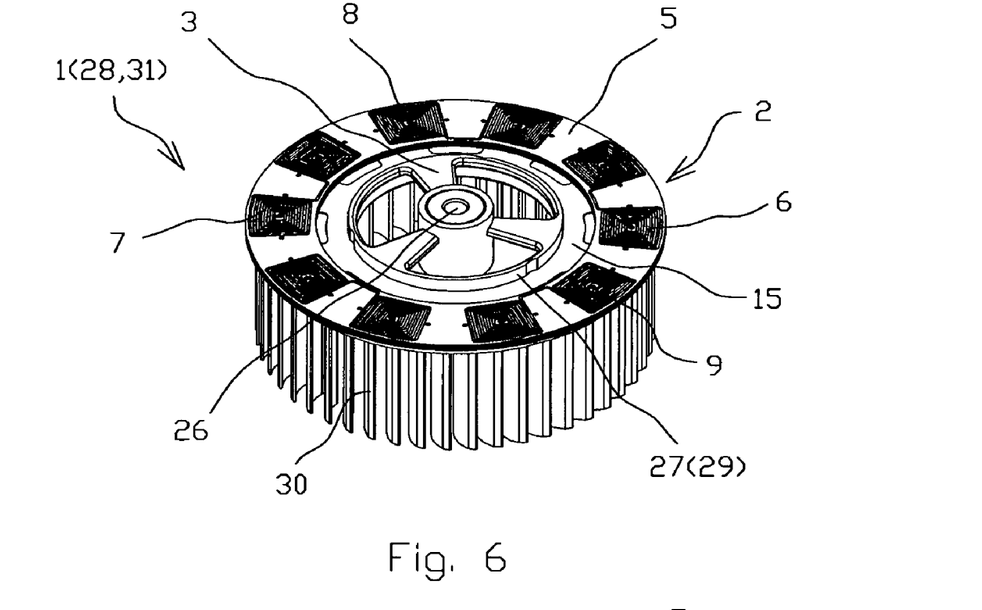
FIG. 6 is a perspective view showing the electromagnetic moving system according to the fourth embodiments of the present invention when the system serves as an electric fan.
Figure 6A:
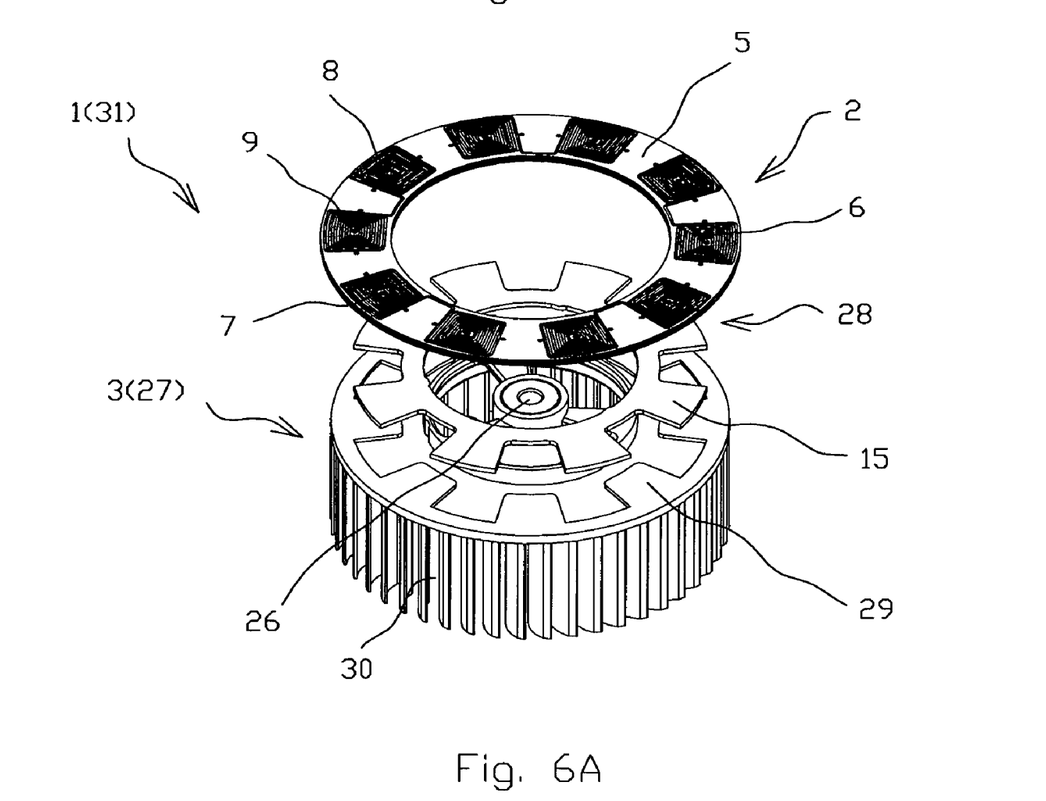
FIG. 6A is a perspective view showing the disassembled electromagnetic moving system according to the fourth embodiments of the present invention when the system serves as an electric fan.
Figure 7:
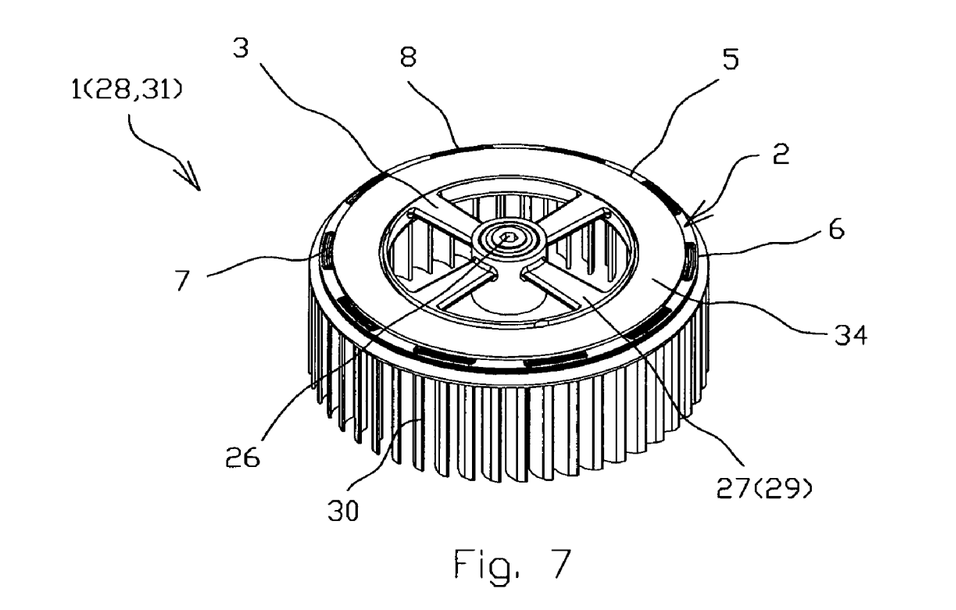
FIG. 7 is a perspective view showing the design option of the electromagnetic moving system according to the fourth embodiments of the present invention when the system serves as an electric fan.
Figure 7A:
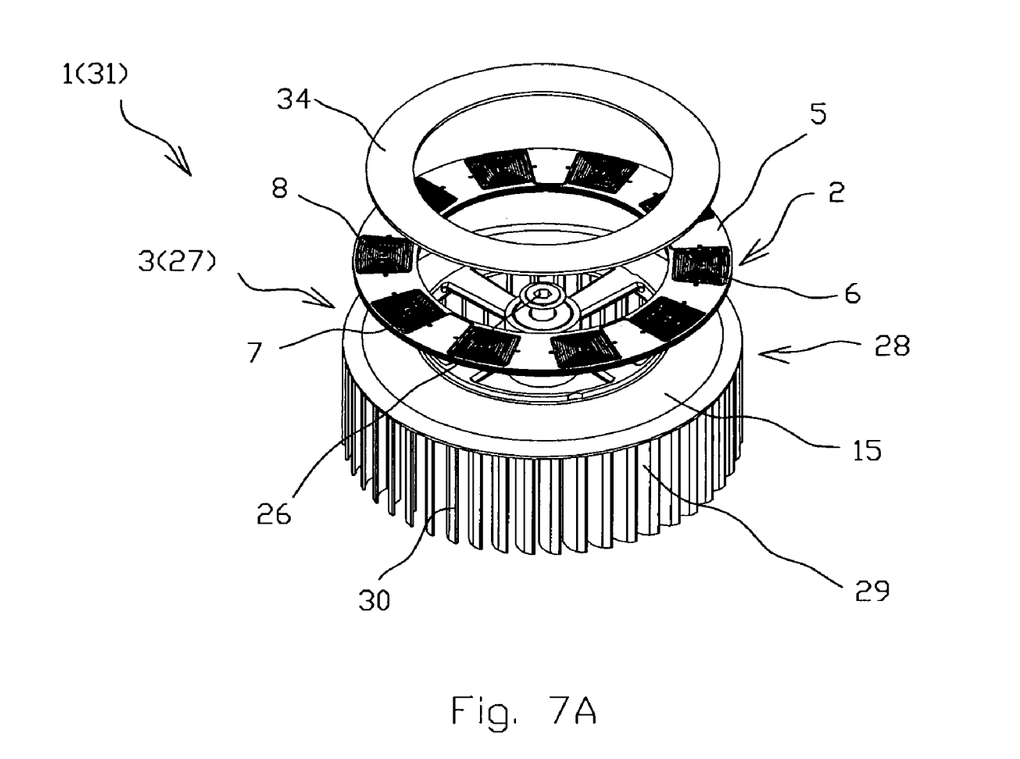
FIG. 7A is a perspective view showing the design option of the disassembled electromagnetic moving system according to the fourth embodiments of the present invention when the system serves as an electric fan.

There is the forth embodiment (FIGS. 4-7) when the stator 2 comprise six identical layers 6-6E of electrically connected coil windings 7 shifted in respect with each other and the center points 9 of the first layer 6 are electrically connected by the via's 16 with the central points 9 of the fourth layer 6C, the center points 9 of the second layer 6A are electrically connected by the via's 16 with the central points 9 of the fifth layer 6D and the center points 9 of the third layer 6B are electrically connected by the via's 16 with the central points 9 of the sixth layer 6E correspondingly, thus the stator 2 servers as a three-phase stator (FIGS. 4-5). The line 13 connecting the center points 9 of the spirals 8 is a circle 25 and the system 1 further comprises a shaft 26 placed at the center of the circle 25 and connected with the moving body 3, thus the moving body 3 serves as a rotor 27 of a circular electric drive. There is a design option of the fourth embodiment when the moving body 3 is made as a magnetized impeller 29 with blades 30 thus the system 1 serves as an electric fan 31 (FIGS. 6-7A).

The stator 2 of the electromagnetic moving system 1 according to the forth embodiment operates in the following ways. When electrical power is supplied from the power source (not shown) through the connectors of the controller (not shown) to the coils windings 7 of the layers 6-6E that operate together as the stator 2 (FIGS. 4A-4B), alternating electromagnetic fields are created and controlled by the speed and voltage regulators (not shown).

Figure 1C:
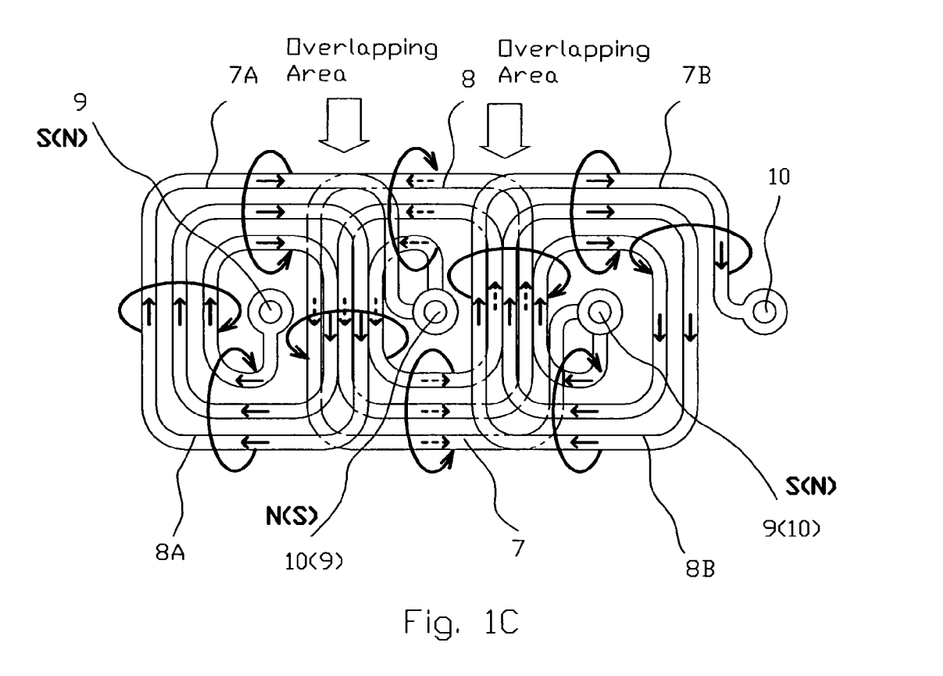
FIG. 1C is a schematic top view illustrating the magnetic fluxes and current directions of the single phase stator according to the first embodiments of the present invention (circuit board is not shown).

For all embodiments the electromagnetic field interacts with a magnetic field created by the permanent magnets 15 of the moving body 3. As a result, the moving body 3 is propelled along the line 13 connected the center points 9. In FIG. 1C arrows indicate the direction of current flow in the coil windings 7, 7A and 7B and arrows also indicate the magnetic flux around the coil windings 7, 7A and 7B. At the areas where the coil windings 7 and 7A and 7 and 7B overlap there is magnetic coupling allowing for a stronger magnetic field to be generated.

The main effect of the present invention that makes it much better than all known technical solutions in this field is as following: the electromagnetic moving system 1 much more reliable and efficient.

What is claimed is:

1. An electromagnetic moving system comprised of a stator, at least one moving body and a controller, wherein:
   (i) said stator comprised of a circuit board with at least two layers of electrically connected coil windings spaced apart in a series way and made as spirals with a center and a peripheral points;
   (ii) each of said spirals has a magnetic axis substantially perpendicular to the plane of the corresponding coil winding;
   (iii) said spirals of one layer are shifted in respect to said spirals of the adjacent layer along the line connecting said center points in such a way thus the center points of said spirals of said one layer in transparent view are located between two nearest spirals of the adjacent layer;
   (iv) each of said spirals of one layer in transparent view at least partially overlaps two nearest spirals of the adjacent layer;
   (v) each of said magnetic axes of said coil windings of one layer has an opposite direction in respect to the magnetic axis direction of two nearest coil windings of the adjacent layer when powered;
   (vi) each of said center and a peripheral points of spirals of one layer is electrically connected through said circuit board by internal via's with each of said peripheral and center points of spirals of the adjacent layer correspondingly;
   (vii) said moving body is comprised of at least one permanent magnet such as to cause interaction with said stator when it is powered, thus creating a force tending to propel said moving body along said line connecting said center points.

2. The system according to claim 1, wherein said spirals are identical and said center point of each of said spirals of one layer is electrically connected through said circuit board by said internal via's, which is a copper plated hole, with said peripheral point of the nearest spiral of the adjacent layer, while said peripheral point of each of said spirals of one layer is electrically connected by said via's with said central point of the another nearest spiral of the adjacent layer thus said stator serves as a single phase stator.

3. The system according to claim 1, wherein said spirals are identical and said center point of each of said spirals of one layer is electrically connected through said circuit board by said internal via's, which is a copper plated hole, with said peripheral point of the spiral following next of the nearest spiral of the adjacent layer, while said peripheral point of each of said spirals of one layer is electrically connected by said via's with said central point of the spiral following next of the another nearest spiral of the adjacent layer thus said stator serves as a three-phase stator.

4. The system according to claim 1, wherein each two adjacent spirals of each layer are oriented opposite one to one and coupled in pair with the mutual peripheral points.

5. The system according to claim 4, wherein each of said center points of each of said pairs of each layer are electrically connected with the nearest center points of the adjacent pairs of the same layer, thus said stator servers as a two-phase stator.

6. The system according to claim 4, wherein said stator comprise six identical layers of electrically connected coil windings shifted in respect with each other and said center points of the first layer are electrically connected by said via's with the central points of the fourth layer, said center points of the second layer are electrically connected by said via's with the central points of the fifth layer and said center points of the third layer are electrically connected by said via's with the central points of the sixth layer correspondingly, thus said stator servers as a three-phase stator.

7. The system according to claim 1, wherein said stator is incorporated with a track with a contact surface, said moving body located on said contact surface, and said line connecting said center points of said spirals is an assembly of straight and curved lines connected in a series way, thus said system serves as a linear electric drive.

8. The system according to claim 7, wherein said line connecting said center points of said spirals forms a close loop.

9. The system according to claim 1, wherein said line connecting said center points of said spirals is a circle.

10. The system according to claim 9, wherein said system further comprises a shaft placed at the center of said circle and connected with said moving body, thus said moving body serves as a rotor of a circular electric drive.

11. The system according to claim 10, wherein said moving body is made as a magnetized impeller with blades thus said system serves as an electric fan.

\* \* \* \* \*